(12) United States Patent
Uziel et al.

(10) Patent No.: US 10,034,305 B2
(45) Date of Patent: Jul. 24, 2018

(54) LBT INTERFACE FOR LOGICAL DTX

(71) Applicant: QUALCOMM Incorporated, San Diego, CA (US)

(72) Inventors: Lior Uziel, Hod Hasharon (IL); Guy Wolf, Rosh Haayin (IL); Shmuel Vagner, Raanana (IL); Yaniv Levi Elgarisi, Tzur Yitzhak (IL)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/170,332

(22) Filed: Jun. 1, 2016

(65) Prior Publication Data

US 2017/0142754 A1 May 18, 2017

Related U.S. Application Data

(60) Provisional application No. 62/254,318, filed on Nov. 12, 2015.

(51) Int. Cl.
*H04W 74/08* (2009.01)
*H04W 76/28* (2018.01)
(Continued)

(52) U.S. Cl.
CPC ........... *H04W 74/0808* (2013.01); *H04L 1/16* (2013.01); *H04W 16/14* (2013.01);
(Continued)

(58) Field of Classification Search
CPC ........... H04W 74/0816; H04W 28/044; H04W 40/12; H04W 52/0216; H04W 28/00;
(Continued)

(56) References Cited

U.S. PATENT DOCUMENTS 6,449,265 B1 * 9/2002 Prieto, Jr. .......... H04B 7/18582
370/329
8,982,849 B1 3/2015 Salhotra et al.
(Continued)

FOREIGN PATENT DOCUMENTS

WO WO-2016163688 A1 10/2016

OTHER PUBLICATIONS

Huawei, et al., "Analysis of LBT Operation for LAA Uplink", 3GPP TSG-RAN WG2 Meeting #90, R2-152219, Fukuoka, Japan, May 25-29, 2015, 6 pgs., XP050972671, 3rd Generation Partnership Project.
(Continued)

*Primary Examiner* — Mohamed Kamara
(74) *Attorney, Agent, or Firm* — Holland & Hart LLP

(57) ABSTRACT

Methods, systems, and devices for wireless communication are described. A base station may support layer-to-layer listen-before-talk (LBT) interfacing for logical discontinuous transmission (DTX) events. That is, a layer one entity of the base station may indicate to a higher layer that a channel is unavailable or experiencing high levels of interference. For example, a layer one entity of the base station may perform a failed clear channel assessment (CCA) or LBT procedure on the channel. The layer one entity may then convey an indication that a scheduled message was not successfully transmitted to a higher layer (e.g., a media access control (MAC) layer that performs link adaptation and scheduling). The higher layer may schedule a retransmission of the message based on the indication. In some cases, the same link parameters may be used. In other cases, the link parameters may be updated based on channel conditions.

30 Claims, 13 Drawing Sheets

(51) Int. Cl.
  *H04L 1/16* (2006.01)
  *H04W 16/14* (2009.01)
  *H04W 72/08* (2009.01)
  *H04W 72/12* (2009.01)
  *H04W 76/04* (2009.01)

(52) U.S. Cl.
  CPC ..... *H04W 72/082* (2013.01); *H04W 72/1273* (2013.01); *H04W 74/0816* (2013.01); *H04W 76/048* (2013.01); *H04W 76/28* (2018.02)

(58) Field of Classification Search
  CPC ............. H04W 72/1278; H04W 72/14; H04W 74/0808; H04W 76/048; H04B 7/0626; H04B 7/2612
  See application file for complete search history.

(56) References Cited

U.S. PATENT DOCUMENTS

| | | | |
|---|---|---|---|
| 2002/0181413 A1* | 12/2002 | Kitagawa | H04L 12/462 370/256 |
| 2012/0176996 A1* | 7/2012 | Kim | H04W 72/0413 370/329 |
| 2014/0362780 A1 | 12/2014 | Malladi et al. | |
| 2015/0078240 A1 | 3/2015 | Huang | |
| 2015/0103777 A1* | 4/2015 | Chen | H04L 5/0044 370/329 |
| 2015/0117369 A1* | 4/2015 | Merlin | H04W 74/0816 370/329 |
| 2015/0173056 A1 | 6/2015 | Yerramalli et al. | |
| 2015/0304940 A1 | 10/2015 | Ryu et al. | |
| 2015/0319599 A1 | 11/2015 | Seok | |
| 2016/0095114 A1* | 3/2016 | Kim | H04W 74/0816 370/329 |
| 2016/0278088 A1* | 9/2016 | Cheng | H04L 47/27 |
| 2017/0048880 A1* | 2/2017 | Anderson | H04W 72/1226 |
| 2017/0055209 A1* | 2/2017 | Lin | H04W 52/02 |

OTHER PUBLICATIONS

ISA/EP, International Search Report and Written Opinion of the International Searching Authority, Int'l Application No. PCT/US2016/048562, dated Nov. 15, 2016, European Patent Office, Rijswijk, NL, 13 pgs.

* cited by examiner

LBT INTERFACE FOR LOGICAL DTX

CROSS REFERENCES

The present application for patent claims priority to U.S. Provisional Patent Application No. 62/254,318 by Uziel et al., titled "LBT Interface For Logical DTX," filed Nov. 12, 2015, assigned to the assignee hereof, and expressly incorporated by reference herein.

BACKGROUND

The following relates generally to wireless communication, and more specifically to a listen-before-talk (LBT) interface for logical discontinuous transmission (DTX).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless wide area networks (WWANs) may be scheduled networks with a base station used as a single control entity to notify each user equipment (UE) of the allocated frequency-time resources (e.g., physical resource block pairs). The UE may be scheduled by a control channel (e.g., Physical Downlink Control Channel (PDCCH) or enhanced Physical Downlink Control Channel (ePDCCH)) to receive downlink (DL) traffic. Further, the UE may receive the DL traffic in a data channel (e.g., Physical Downlink Shared Channel (PDSCH)). In some cases, WWANs may operate in an unlicensed band (e.g., together with a wireless local area network (WLAN)). Compared to a WLAN, a WWAN may enjoy better link performance, medium access control, mobility management, or improved coverage.

Regulatory standards for operating in a shared or unlicensed band (e.g., the 5 GHz band) may include performing a Clear Channel Assessment (CCA) or a listen-before-talk (LBT) mechanism for channel sensing prior to transmission. If the LBT procedure is carried out by the physical (PHY) layer, higher layers (e.g., the media access control (MAC) layer) may be unaware of whether the channel is checked out. That is, without notification of a failure to access a channel, the higher layers may assume that the DL traffic was decoded unsuccessfully by the UE, which may influence link adaptation of the data or control channels. The higher layer scheduling may schedule a retransmission, which may be inefficient as the traffic was not originally transmitted. This may result in missed packets, delays, or reduced throughput.

SUMMARY

A base station may support layer-to-layer listen-before-talk (LBT) interfacing for logical discontinuous transmission (DTX) events. That is, a layer one entity of the base station may indicate to a higher layer that a channel is unavailable or experiencing high levels of interference. For example, a layer one entity of the base station may perform a failed clear channel assessment (CCA) or LBT procedure on a channel. The layer one entity may then convey an indication to a higher layer (e.g., a media access control (MAC) layer that performs link adaptation and scheduling) that a schedule message was not successfully transmitted. The higher layer may schedule a retransmission of the message based on the indication. In some cases, the same link parameters may be used. In other cases, the link parameters may be updated based on channel conditions.

A method of wireless communication is described. The method may include forwarding a downlink (DL) configuration message from a layer two entity on a device to a layer one entity on the device, refraining from transmitting a user message associated with the DL configuration message based at least in part on a channel condition and forwarding a non-transmission indicator for the user message from the layer one entity to the layer two entity based at least in part on refraining from transmitting the user message.

An apparatus for wireless communication is described. The apparatus may include means for forwarding a DL configuration message from a layer two entity on a device to a layer one entity on the device, means for refraining from transmitting a user message associated with the DL configuration message based at least in part on a channel condition and means for forwarding a non-transmission indicator for the user message from the layer one entity to the layer two entity based at least in part on refraining from transmitting the user message.

A further apparatus is described. The apparatus may include a processor, memory in electronic communication with the processor, and instructions stored in the memory. The instructions may be operable to cause the processor to forward a DL configuration message from a layer two entity on a device to a layer one entity on the device, refrain from transmitting a user message associated with the DL configuration message based at least in part on a channel condition and forward a non-transmission indicator for the user message from the layer one entity to the layer two entity based at least in part on refraining from transmitting the user message.

A non-transitory computer readable medium for wireless communication is described. The non-transitory computer-readable medium may include instructions to cause a processor to forward a DL configuration message from a layer two entity on a device to a layer one entity on the device, refrain from transmitting a user message associated with the DL configuration message based on a channel condition and forward a non-transmission indicator for the user message from the layer one entity to the layer two entity based on refraining from transmitting the user message.

Some examples of the method, apparatus, or non-transitory computer-readable medium described above may further include processes, features, means, or instructions for determining that an LBT procedure performed by the device has failed, where the channel condition is based on the determination that the LBT procedure has failed.

Some examples of the method, apparatus, or non-transitory computer-readable medium described above may further include processes, features, means, or instructions for forwarding an LBT indicator from the layer two entity to the layer one entity, where the LBT procedure is performed based on the LBT indicator.

In some examples of the method, apparatus, or non-transitory computer-readable medium described above, determining that the LBT procedure has failed comprises: determining that at least one of a CCA or an enhanced CCA (eCCA) has failed. In some examples of the method, apparatus, or non-transitory computer-readable medium described above, the channel condition comprises a determination that an interference level exceeds a threshold. In some embodiments, a determination that the interference level exceeds a threshold may include detecting parameters associated with a Wi-Fi preamble.

Some examples of the method, apparatus, or non-transitory computer-readable medium described above may further include processes, features, means, or instructions for forwarding a rescheduled DL configuration message from the layer two entity to the layer one entity based on the non-transmission indicator. In some examples of the method, apparatus, or non-transitory computer-readable medium described above, forwarding the rescheduled DL configuration message comprises: including a same hybrid automatic repeat request (HARD) process, a same redundancy version (RV), or a same modulation and coding scheme (MCS) or any combination thereof, as was included in the DL configuration message.

In some examples of the method, apparatus, or non-transitory computer-readable medium described above, forwarding the rescheduled DL configuration message comprises: forwarding the rescheduled DL configuration message with a higher precedence than the DL configuration message. In some examples of the method, apparatus, or non-transitory computer-readable medium described above, the layer one entity is a physical (PHY) layer entity and the layer two entity is a MAC entity. In some examples of the method, apparatus, or non-transitory computer-readable medium described above, forwarding the non-transmission indicator comprises: forwarding a logical negative acknowledgement (NACK) from the layer one entity to the layer two entity.

Some examples of the method, apparatus, or non-transitory computer-readable medium described above may further include processes, features, means, or instructions for selecting a link parameter based on the non-transmission indicator.

In some examples of the method, apparatus, or non-transitory computer-readable medium described above, selecting a link parameter comprises: refraining from modifying the link parameter from a value associated with the DL configuration message. In some examples of the method, apparatus, or non-transitory computer-readable medium described above, selecting a link parameter comprises: adapting the link parameter based at least in part one or more factors other than the non-transmission indicator.

In some examples of the method, apparatus, or non-transitory computer-readable medium described above, the link parameter comprises a MCS, an aggregation level, or both. Some examples of the method, apparatus, or non-transitory computer-readable medium described above may further include processes, features, means, or instructions for refraining from reserving an uplink (UL) acknowledgement (ACK) resource based on the non-transmission indicator or refraining from advancing an HARQ retransmission counter based at least in part on the non-transmission indicator.

DETAILED DESCRIPTION

Figure 1:
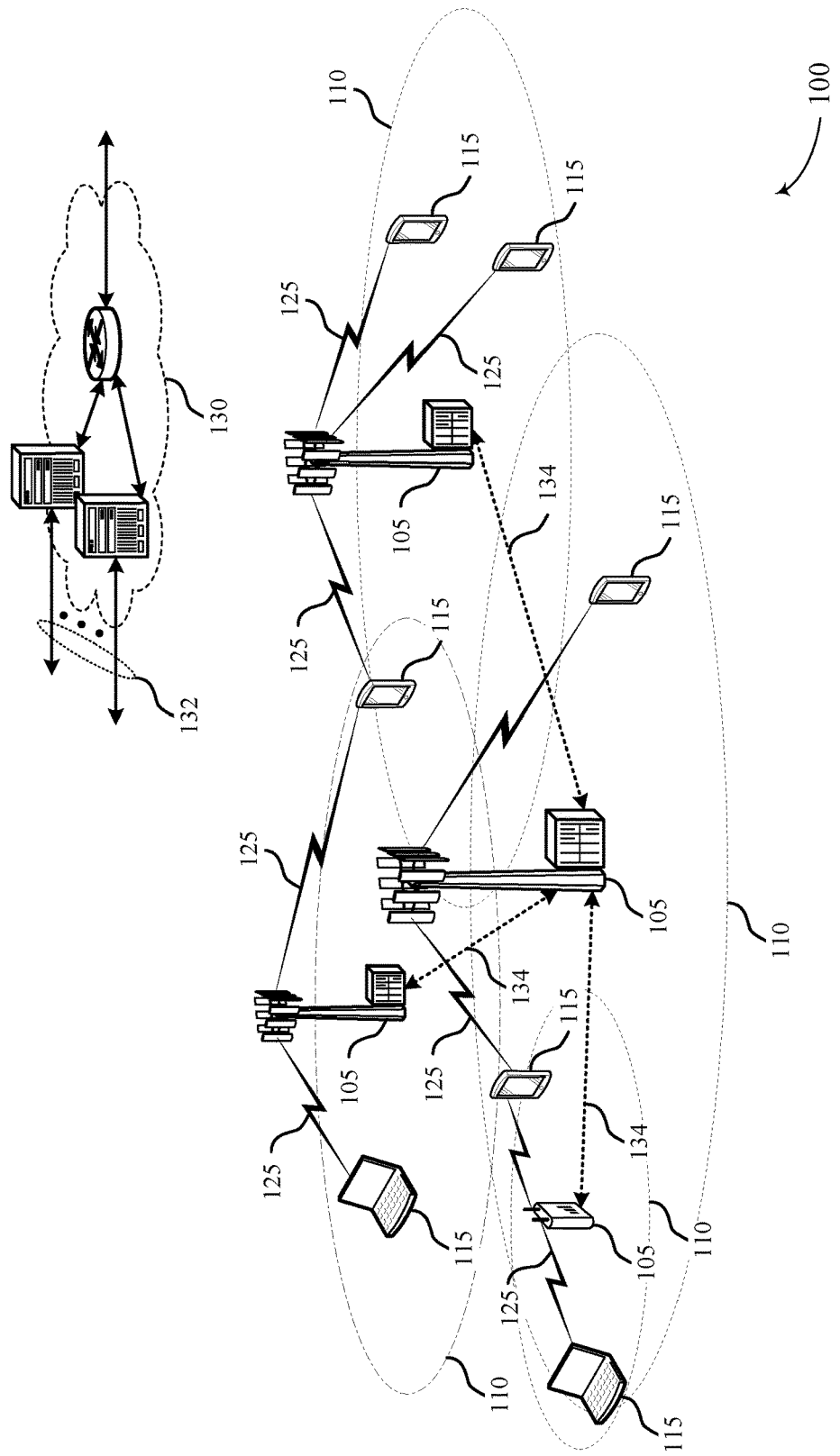
FIG. 1 illustrates an example of a wireless communications system that supports a listen-before-talk (LBT) interface for logical discontinuous transmission (DTX) in accordance with aspects of the present disclosure.

Both wireless local area networks (WLANs) and wireless wide area networks (WWANs) may operate in an unlicensed band. However, WWANs may enjoy better link performance, medium access control, mobility management, or improved coverage than WLANs in the unlicensed band. Regulatory standards for operating in a shared or unlicensed band (e.g., the 5 GHz band) may include performing a Clear Channel Assessment (CCA) or a listen-before-talk (LBT) mechanism for channel sensing prior to transmission.

In WWANs, channel access may be handled by the lower layers (e.g., physical (PHY) layer). At higher layers (e.g., above the PHY layer), a base station may control the scheduling and link adaptation for each serviced user equipment (UE). Link adaptation may include adaptation of the modulation and coding scheme (MCS) and the coding rate for error correction according to the quality of the channel. Uplink (UL) feedback such as acknowledgement (ACK)/ negative-acknowledgement (NACK) reporting and implicit discontinuous transmission (DTX) "reporting" may also support link adaptation. That is, upon receipt of a downlink (DL) transport block (TB), a UE may send an ACK/NACK report to indicate successful or unsuccessful decoding. Alternatively, a UE may send a DTX report to indicate the UE has failed to receive a DL TB.

As the LBT procedure is carried out by the PHY layer, it may be appropriate to notify higher layers of the channel access failure (e.g., the media access control (MAC) layer, or another layer above the PHY layer that performs link adaptation and scheduling). Without notification of a failure to access a channel, the higher layers may assume that the DL traffic was decoded unsuccessfully by the UE, which may influence link adaptation of the data or control channels. The higher layer scheduling may reschedule a retransmission, which may be inefficient as the traffic was not originally transmitted. This may result in missed packets, delays, or reduced throughput.

A lower layer (e.g., the PHY layer) may send an indication (e.g., during each subframe) to the higher layers indicating when DL traffic is not transmitted due to failure to access a channel (or due to a withheld transmission when channel interference is high). This event may be interpreted by the higher layers as a logical DTX event (an actual DTX event may occur when a UE fails to receive DL control information over a physical channel). Following the CCA failure indication, the higher layer link adaptation procedure may maintain certain transmission resources or schemes (e.g., the Physical Downlink Control Channel (PDCCH) or Physical Downlink Shared Channel (PDSCH) MCS may not change). However, if the PHY layer reports indicate additional information, such as channel conditions that led to the CCA failure, the MCS may be changed. For example, if channel interference or hidden node information is included in the report, the MCS may be made more robust.

Upon receiving the non-transmission indication for a TB for a certain UE, the scheduler may schedule transmission of the TB again. In some cases the rescheduled transmission may have the same attributes as the TB associated with the failed CCA (e.g., same New Data Indicator (NDI), same redundancy version (RV), or same hybrid Automatic Repeat Request (HARQ) process). In some cases, the rescheduled transmission may be given the same priority as other retransmissions, or an intermediate priority between an initial transmission and a retransmission. This may be based on the rescheduled transmission having a lower round trip time than a transmission rescheduled due to a NACK or DTX indication from a UE.

The use of an indication of a failure to access a channel may enable a base station to free resources that would otherwise be allocated to ACK/NACK reporting (e.g., for a Physical Uplink Control Channel (PUCCH) index a number of subframes after the CCA failure). Thus, the use of a non-transmission indicator may allow decoding of the PUSCH (a number of subframes after the CCA failure) without taking ACK/NACK bits into account (e.g., not having the ACK/NACK bits punctured in the PUSCH) as the UE may not send an ACK/NACK.

In another example, the indication of a failure to access a channel may prevent higher layers from abandoning the HARQ process. There may be a fixed number of HARQ retransmissions before the TB is abandoned. This may prevent channel resources from being occupied when the channel to the UE is lost or deteriorated. Therefore, the higher layer may decide to not count the indication of a failure to access a channel in order to allow the TB an increased chance to be transmitted before being abandoned.

Aspects of the disclosure are initially described in the context of a wireless communication system. Narrative diagrams illustrate methods of LBT interfacing for logical DTX communication in addition to examples of different transmission and message forwarding scenarios. Aspects of the disclosure are further illustrated by and described with reference to apparatus diagrams, system diagrams, and flowcharts that relate to an LBT interface for logical DTX.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Base stations 105 may support layer-to-layer LBT interfacing for logical DTX events. That is, a lower layer entity may forward channel access indicator messages to a higher layer. If the indicator conveys a failure to access a channel or a non-transmission, it may be interpreted as a logical DTX event.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Communication between a UE 115 and a base station 105 may be supported by multiple protocol layers. For example, layer one or the PHY layer may be responsible for gaining access to a physical medium, determining channel conditions, and assigning data blocks to physical time and frequency resources. A layer two entity, (which in some cases may be known as a MAC layer entity) may be responsible for scheduling transmissions, determining whether a transmission is successful, and selecting communication parameters (known as link adaptation). Higher layers may be responsible for establishing radio bearers, sequencing packets, establishing network access, generating and displaying user content, etc.

In some cases, a UE 115 or base station 105 may operate in a shared or unlicensed frequency spectrum. These devices may perform an LBT procedure such as a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. If a CCA fails, the device may wait until the channel is clear before attempting to transmit. In some cases, LBT procedures are performed at a layer one (e.g., PHY) entity, whereas transmission scheduling may be performed at a higher layer (e.g., layer two).

In some cases, wireless communications system 100 may utilize one or more enhanced component carriers (eCCs). An eCC may be characterized by one or more features including: flexible bandwidth, different transmission time intervals (TTIs), operation in unlicensed spectrum, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI.

In some examples, an eCC may include multiple hierarchical layers associated with the different TTI lengths. For example, TTIs at one layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a base station 105 may support layer-to-layer LBT interfacing for logical DTX events. That is, a layer one entity of the base station may indicate to a higher layer that a channel is unavailable or experiencing high levels of interference. For example, a layer one entity of the base station may perform a failed CCA or LBT procedure on the channel. The layer one entity may then convey an indication that a scheduled message was not successfully transmitted to a higher layer (e.g., a MAC layer that performs link adaptation and scheduling). The higher layer may schedule a retransmission of the message based on the indication. In some cases, the same link parameters may be used. In other cases, the link parameters may be updated based on channel conditions.

Figure 2:
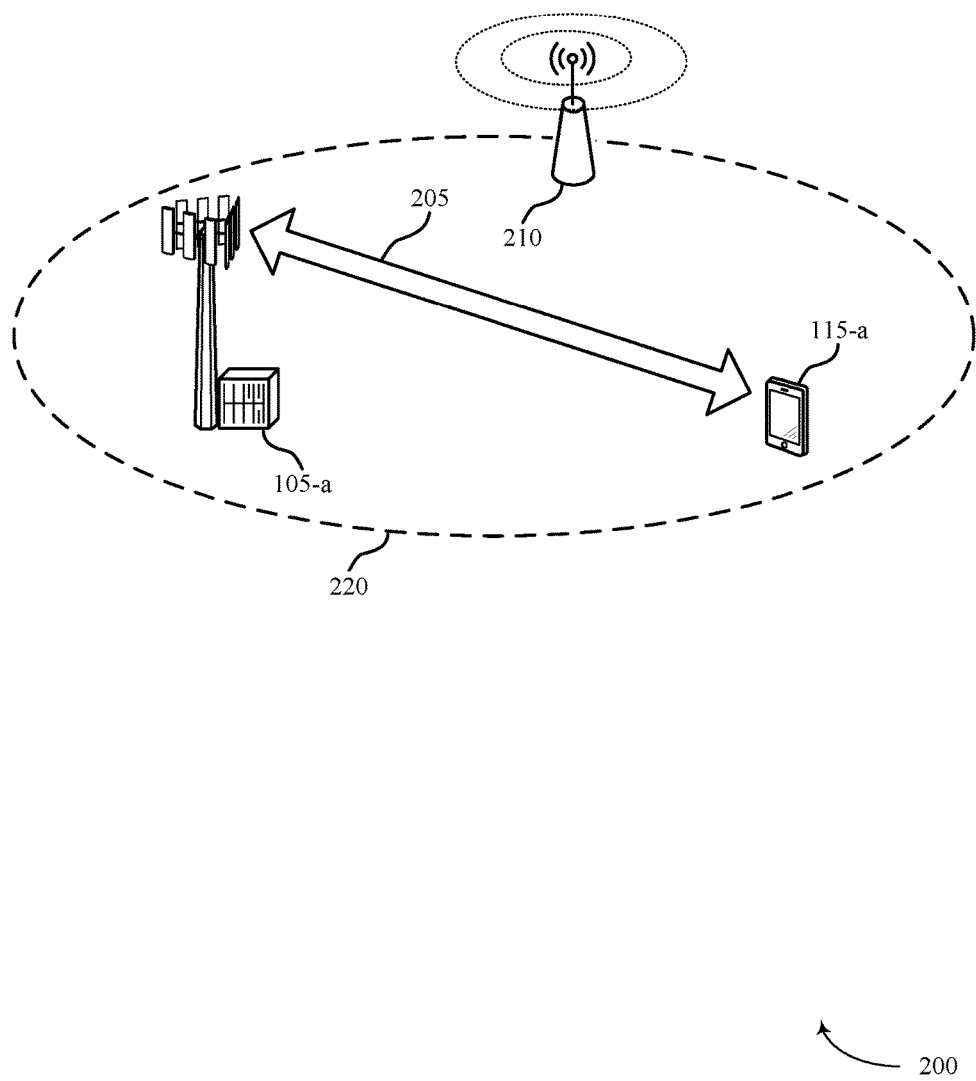
FIG. 2 illustrates an example of a wireless communications system that supports an LBT interface for logical DTX in accordance with aspects of the present disclosure.

FIG. 2 illustrates an example of a wireless communications system 200 that supports an LBT interface for logical DTX. Wireless communications system 200 may be a wireless wide area network (WWAN) including base station 105-a and UE 115-a, which may be examples of the corresponding devices described with reference to FIG. 1. A layer one entity (e.g., PHY layer) of base station 105-a may perform an LBT procedure prior to communicate with UE 115-a, and may forward the results in a channel access indicator to a higher layer. Base station 105-a may configure rescheduled transmissions based on the channel access indicator.

Wireless communications system 200 may operate in a shared or unlicensed frequency band. Regulatory standards for operating in a shared or unlicensed band (e.g., the 5 GHz band) may include performing a CCA or another LBT mechanism for channel sensing prior to transmission. Channel access may be handled by the lower layers (e.g., PHY layer). In the higher layers (e.g., above the PHY layer), base station 105-a may control the scheduling and link adaptation for UE 115-a. Link adaptation may include adaptation of the MCS and the coding rate for error correction according to the quality of a channel 205. UL feedback such as ACK/NACK reporting and implicit DTX reporting may also support link adaptation. That is, upon receipt of a DL TB, UE 115-a may send an ACK/NACK report to indicate successful or unsuccessful decoding. Alternatively, UE 115-a may send a DTX report to indicate UE 115-a has failed to receive a DL TB.

As the LBT procedure is carried out by the PHY layer, it may be appropriate to notify higher layers of the channel access failure (e.g., the MAC layer, or another layer above the PHY layer that performs link adaptation and scheduling). Without notification of a failure to access the channel 205, the higher layers may assume that DL traffic was decoded unsuccessfully by UE 115-a, which may influence link adaptation of the data or control channels. The higher layer scheduling may reschedule a retransmission, which may be inefficient as the traffic was not originally transmitted. This may result in missed packets, delays, or reduced throughput.

A lower layer (e.g., the PHY layer) may send an indication (e.g., during each subframe) to the higher layers indicating when DL traffic is not transmitted due to failure to access a channel 205 (or due to a withheld transmission when channel interference is high). This event may be interpreted by the higher layers as a logical DTX event (an actual DTX event may occur when a UE fails to receive DL control information over a physical channel).

Following the CCA failure indication, the higher layer link adaptation procedure may maintain certain transmission resources or schemes (e.g., the PDCCH or PDSCH MCS may not change). However, if the PHY layer reports indicate additional information, such as the conditions of channel 205 that led to the CCA failure, the MCS may be changed. For example, information relating to channel interference (e.g., from a hidden node 210) information is included in report, the MCS may be made more robust.

Upon receiving the non-transmission indication for a TB for UE 115-a, the scheduler may schedule transmission of the TB again. In some cases the rescheduled transmission may have same attributes as the TB associated with the failed CCA (e.g., same NDI, same RV, or same HARQ process). In some cases, the rescheduled transmission may be given the same priority as other retransmissions, or an intermediate priority between an initial transmission and a retransmission. This may be based on the rescheduled transmission having a lower round trip time than a transmission rescheduled due to a NACK or DTX indication from a UE 115.

The use of an indication of a failure to access channel 205 may enable base station 105-a to free resources that would otherwise be allocated to ACK/NACK reporting (e.g., for a PUCCH index a number of subframes after the CCA failure). Thus, the use of failure to access a channel indicators may allow decoding of the PUSCH (a number of subframes after the CCA failure) without taking ACK/NACK bits into account (e.g., not having the ACK/NACK bits punctured in the PUSCH) as UE 115-a may not send an ACK/NACK.

Figure 3:
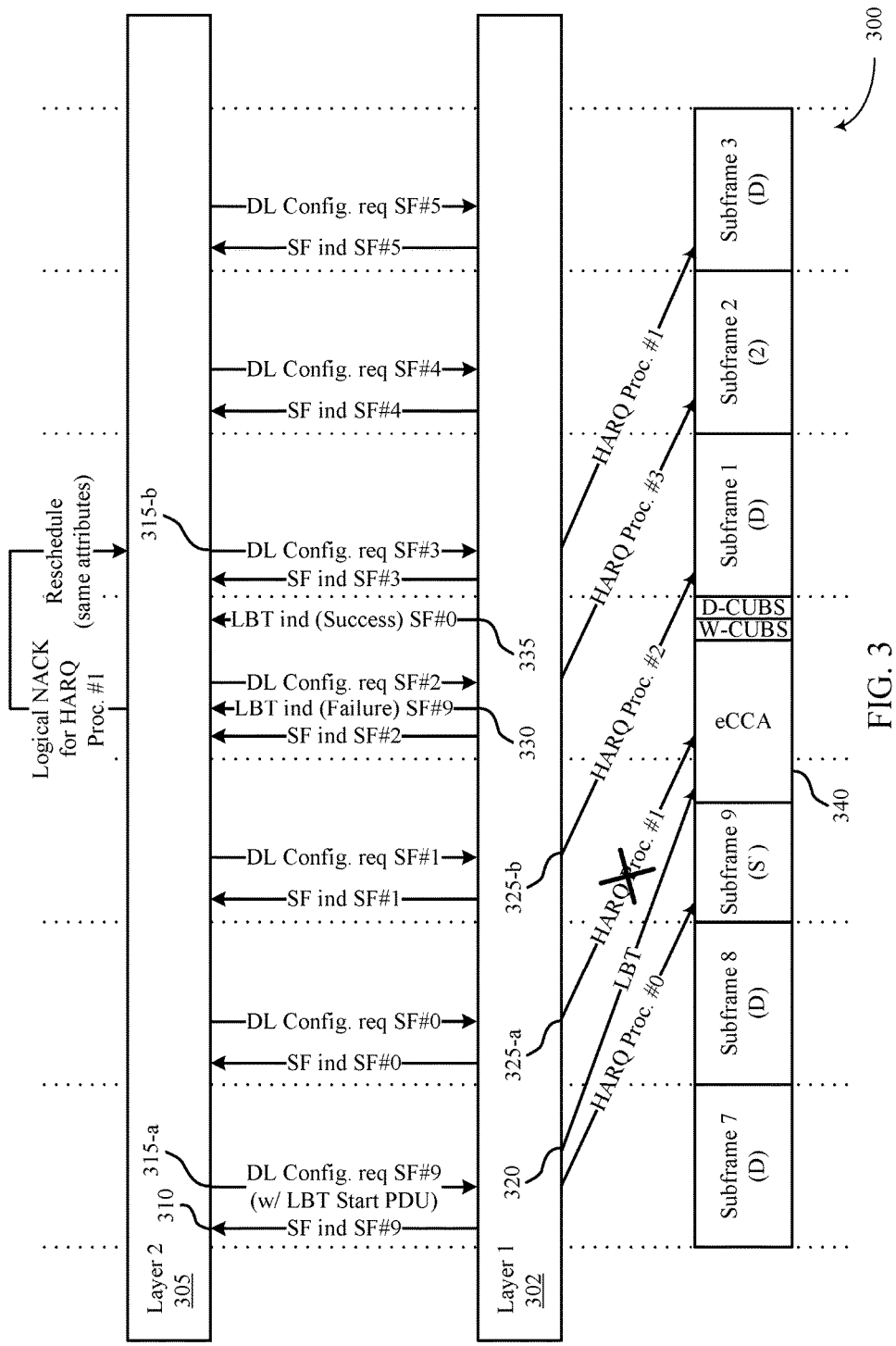
FIG. 3 illustrates an example of a transmission timeline that supports an LBT interface for logical DTX in accordance with aspects of the present disclosure.

FIG. 3 illustrates an example of a transmission timeline 300 that supports an LBT interface for logical DTX. In some cases, transmission timeline 300 may represent aspects of techniques performed by a UE 115 or base station 105 as described with reference to FIGS. 1-2. A first layer 302 (e.g., the PHY layer) may communicate with a second layer 305 (e.g., the MAC layer) regarding whether a message (e.g., DL message 325-a) has been transmitted.

The first layer 302 may forward a subframe indication message 310 to the second layer 305. The second layer 305 may then forward a DL configuration request 315 to the first layer 302. The DL configuration request 315-a may include an indication to perform an LBT procedure. Based on the DL configuration request 315-a, the first layer 302 may perform the LBT procedure 320.

DL configuration request 315 may include a data packet and configuration information for DL message 325-a. DL message 325 may be associated with a HARQ process, an NDI, and an RV that may be received by a UE 115 in a data channel (e.g., a PDSCH). However, in some cases the LBT procedure 320 may fail and the device may not gain access to the channel. Thus, DL message 325-a may not be transmitted.

Following the failed LBT procedure 320, a failed LBT indicator 330 may be forwarded from the first layer 302 to the second layer 305. The second layer 305 or a higher layer (e.g., layers above the second layer 305) may interpret the failed LBT indicator 330 as an indication of a logical DTX, which may also be known as a logical NACK. As a result, the second layer 305 may prepare to reschedule a transport block associated with DL configuration request 315-a.

Once first layer 302 has performed a subsequent successful LBT procedure (e.g., including eCCA 340), a successful LBT indicator 335 (indicating access to the channel) may be forwarded from the first layer 302 to the second layer 305. Once the second layer 305 receives LBT indicator 335, a higher layer (e.g., layers above the second layer 305) may reschedule the data associated with DL configuration request 315-a via DL configuration request 315-b.

In some cases, DL configuration request 315-b may contain the same attributes as DL configuration request 315-a (e.g., MCS, RV, NDI, HARQ process). The second layer 305 again may then forward a DL configuration request 315 to the first layer 302. The first layer 302 may then transmit DL message 325-b.

Figure 4:
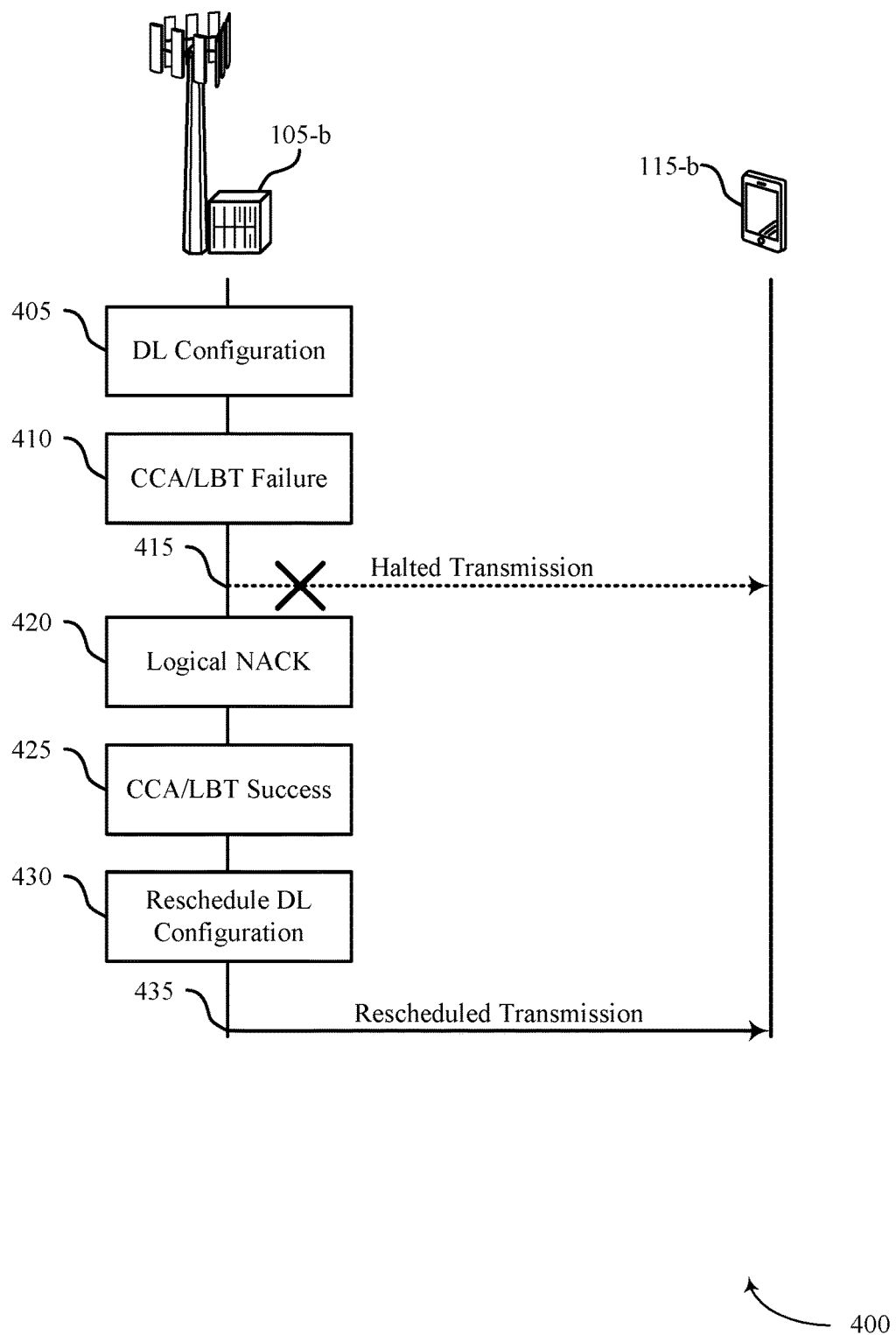
FIG. 4 illustrates an example of a process flow in a system that supports an LBT interface for logical DTX in accordance with aspects of the present disclosure.

FIG. 4 illustrates an example of a process flow 400 that supports an LBT interface for logical DTX in accordance with various aspects of the present disclosure. Process flow 400 may include base station 105-b and UE 115-b, which may be examples of the corresponding devices described with reference to FIG. 1-2.

At step 405, base station 105-b may transmit a DL configuration message from a layer two entity to a layer one entity. The layer one entity may be a physical layer, and the layer two entity may be a MAC entity. The DL configuration message may also include or be accompanied by an indication for the layer one entity to perform an LBT.

At step 410, base station 105-b may determine that an LBT procedure has failed. The LBT procedure may comprise a CCA, an eCCA, or both and may be performed based at least in part on the LBT indicator.

At step 415, base station 105-b may refrain from transmitting a user message associated with the DL configuration message based on the failed LBT. In some cases, in place of a failed LBT, the layer one entity may simply determine that channel conditions are not conducive to transmitting the message as described above.

At step 420, base station 105-b may forward a non-transmission indicator (e.g., an LBT failure indicator) from the layer one entity to the layer two entity. The non-transmission failure indicator may be interpreted as an indication of a logical DTX, which may be known as a logical NACK. A link parameter (e.g., an MCS) may be adapted based at least in part on the LBT failure indicator. In some cases, base station 105-b may refrain from reserving an uplink acknowledgement resource based at least in part on the LBT failure indicator. Additionally or alternatively, base station 105-b may refrain from advancing a HARQ retransmission counter based at least in part on the non-transmission indicator At step 425, base station 105-b may determine that a LBT procedure is successful (or that channel conditions are conducive to transmitting). At step 430, the layer two entity may reschedule the DL transmission based on the successful LBT (or channel conditions). That is, base station 105-b may forward a rescheduled downlink configuration message from the layer two entity to the layer one entity. The rescheduled downlink configuration message may be based on the same HARQ process, RV, and MCS as the original DL configuration message. In some cases, the rescheduled DL configuration message may indicate a higher precedence than the original DL configuration message. At step 435, base station 105-b may transmit the rescheduled transmission to UE 115-b.

Figure 5:
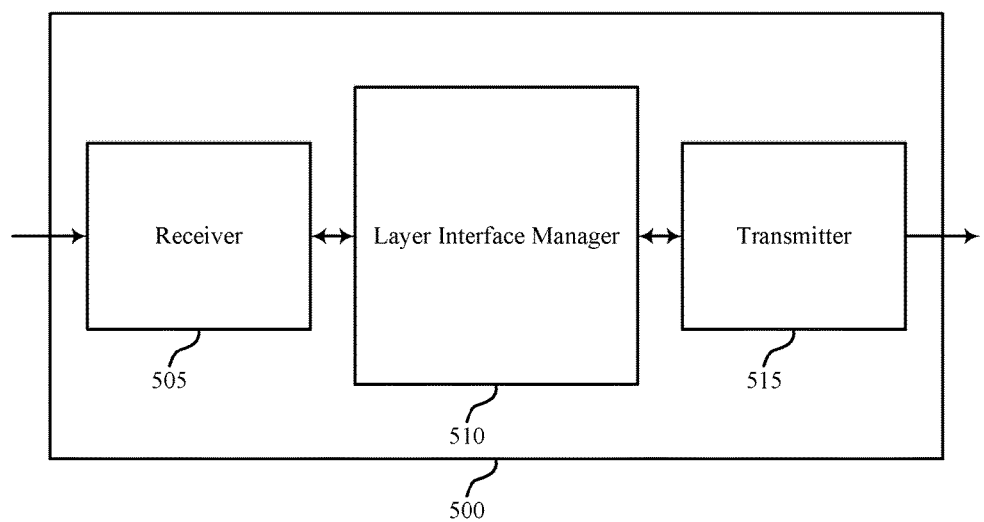
FIGS. 5 through 7 show block diagrams of a wireless device that supports an LBT interface for logical DTX in accordance with aspects of the present disclosure.

FIG. 5 shows a block diagram of a wireless device 500 that supports an LBT interface for logical DTX in accordance with various aspects of the present disclosure. Wireless device 500 may be an example of aspects of a base station 105 described with reference to FIGS. 1, 2, and 4. Wireless device 500 may include receiver 505, layer interface manager 510 and transmitter 515. Wireless device 500 may also include a processor. Each of these components may be in communication with each other.

The receiver 505 may receive information such as packets, user data, or control information associated with various information channels (e.g., control channels, data channels, and information related to LBT interface for logical DTX, etc.). Information may be passed on to other components of the device. The receiver 505 may be an example of aspects of the transceiver 825 described with reference to FIG. 8.

The layer interface manager 510 may forward a downlink configuration message from a layer two entity on a device to a layer one entity on the device, refrain from transmitting a user message associated with the downlink configuration message based at least in part on a channel condition, and forward a non-transmission indicator for the user message from the layer one entity to the layer two entity based at least in part on refraining from transmitting the user message. The layer interface manager 510 may also be an example of aspects of the layer interface manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
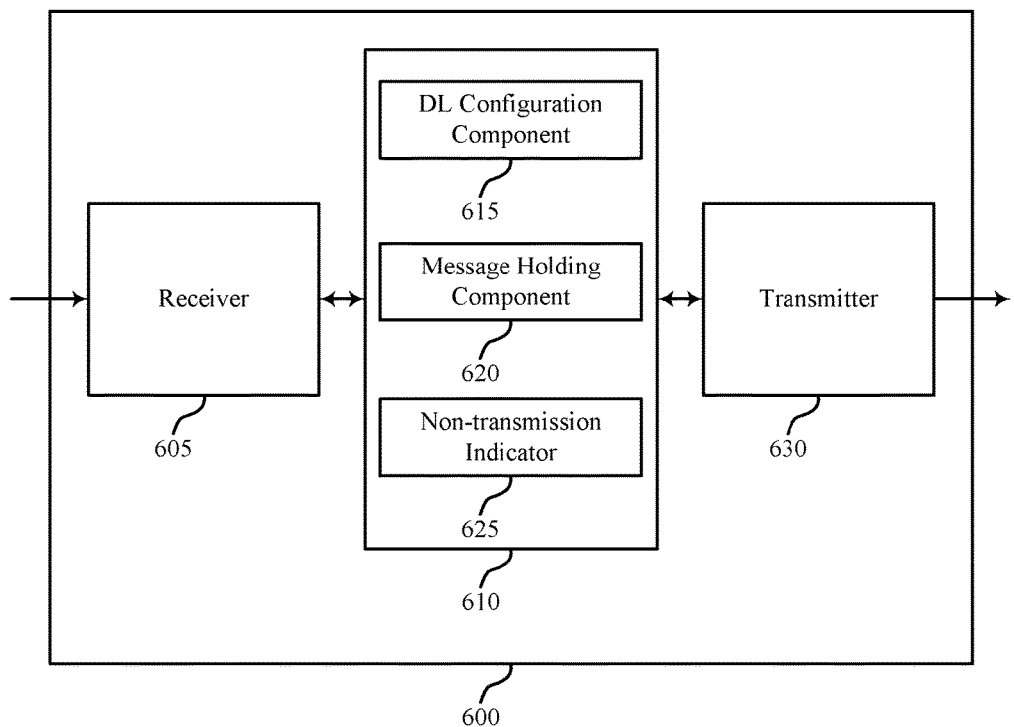

FIG. 6 shows a block diagram of a wireless device 600 that supports an LBT interface for logical DTX in accordance with various aspects of the present disclosure. Wireless device 600 may be an example of aspects of a wireless device 500 or a base station 105 described with reference to FIGS. 1, 2, 4, and 5. Wireless device 600 may include receiver 605, layer interface manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The layer interface manager 610 may be an example of aspects of layer interface manager 510 described with reference to FIG. 5. The layer interface manager 610 may include DL configuration component 615, message holding component 620 and non-transmission indicator 625. The layer interface manager 610 may be an example of aspects of the layer interface manager 805 described with reference to FIG. 8.

The DL configuration component 615 may forward a downlink configuration message from a layer two entity on a device to a layer one entity on the device. In some cases, the layer one entity is a physical layer entity and the layer two entity is a MAC entity.

The message holding component 620 may refrain from transmitting a user message associated with the downlink configuration message based at least in part on a channel condition. In some cases, the channel condition comprises a determination that an interference level exceeds a threshold.

The non-transmission indicator 625 may forward a non-transmission indicator for the user message from the layer one entity to the layer two entity based at least in part on refraining from transmitting the user message. In some cases, forwarding the non-transmission indicator includes forwarding a logical NACK from the layer one entity to the layer two entity.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
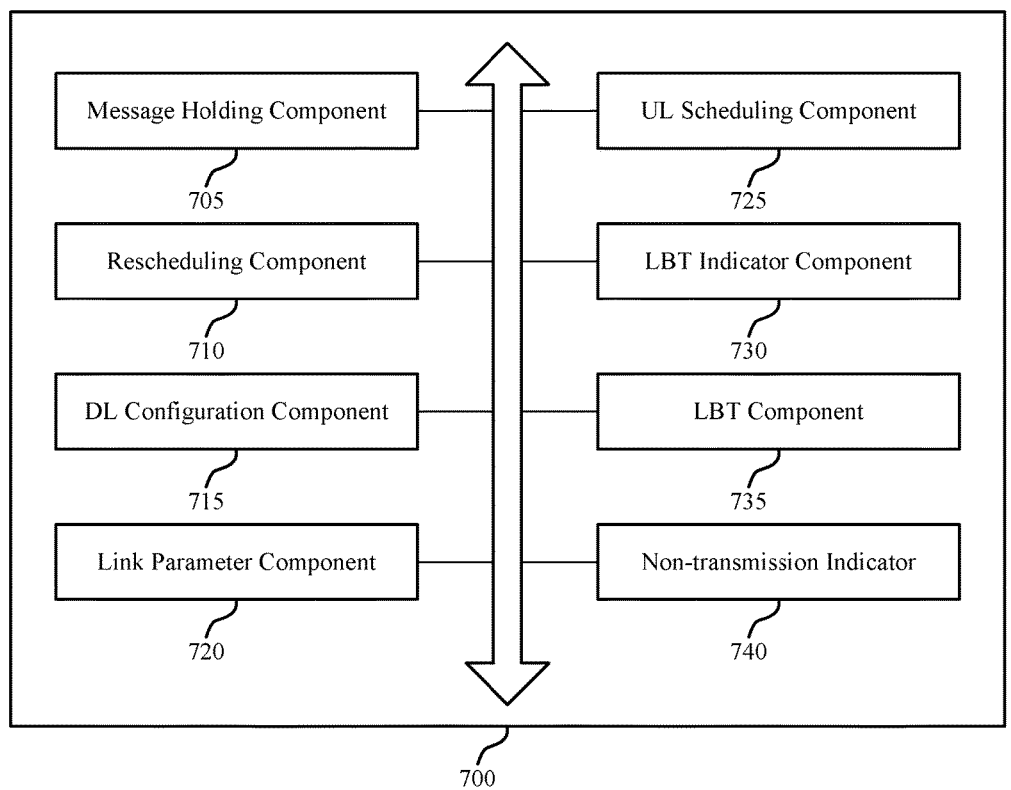

FIG. 7 shows a block diagram of a layer interface manager 700 which may be an example of the corresponding component of wireless device 500 or wireless device 600. That is, layer interface manager 700 may be an example of aspects of layer interface manager 510 or layer interface manager 610 described with reference to FIGS. 5 and 6. The layer interface manager 700 may also be an example of aspects of the layer interface manager 805 described with reference to FIG. 8.

The layer interface manager 700 may include message holding component 705, rescheduling component 710, DL configuration component 715, link parameter component 720, UL scheduling component 725, LBT indicator component 730, LBT component 735 and non-transmission indicator 740. Each of these modules may communicate, directly or indirectly, with one another (e.g., via one or more buses).

The DL configuration component 715 may forward a downlink configuration message from a layer two entity on a device to a layer one entity on the device. The message holding component 705 may refrain from transmitting a user message associated with the downlink configuration message based at least in part on a channel condition. The non-transmission indicator 740 may forward a non-transmission indicator for the user message from the layer one entity to the layer two entity based at least in part on refraining from transmitting the user message.

The rescheduling component 710 may forward a rescheduled downlink configuration message from the layer two entity to the layer one entity based at least in part on the non-transmission indicator. In some cases, forwarding the rescheduled DL configuration message includes including a same HARQ process, a same RV, or a same MCS or any combination thereof, as was included in the DL configuration message. In some cases, forwarding the rescheduled DL configuration message includes forwarding the rescheduled DL configuration message with a higher precedence than the DL configuration message.

The link parameter component 720 may select a link parameter based at least in part on the non-transmission indicator. In some cases, selecting a link parameter includes refraining from modifying the link parameter from a value associated with the downlink configuration message. In some cases, selecting a link parameter includes adapting the link parameter based at least in part one or more factors other than the non-transmission indicator. In some cases, the link parameter comprises an MCS, an aggregation level, or both.

The UL scheduling component 725 may refrain from reserving a UL ACK resource based at least in part on the non-transmission indicator. Additionally or alternatively, the UL scheduling component 725 may refrain from advancing a HARQ retransmission counter based at least in part on the non-transmission indicator. The LBT indicator component 730 may forward an LBT indicator from the layer two entity to the layer one entity, wherein the LBT procedure is performed based at least in part on the LBT indicator.

The LBT component 735 may determine that an LBT procedure performed by the device has failed, wherein the channel condition is based on the determination that the LBT procedure has failed. In some cases, determining that the LBT procedure has failed includes determining that at least one of a CCA or an eCCA has failed.

Figure 8:
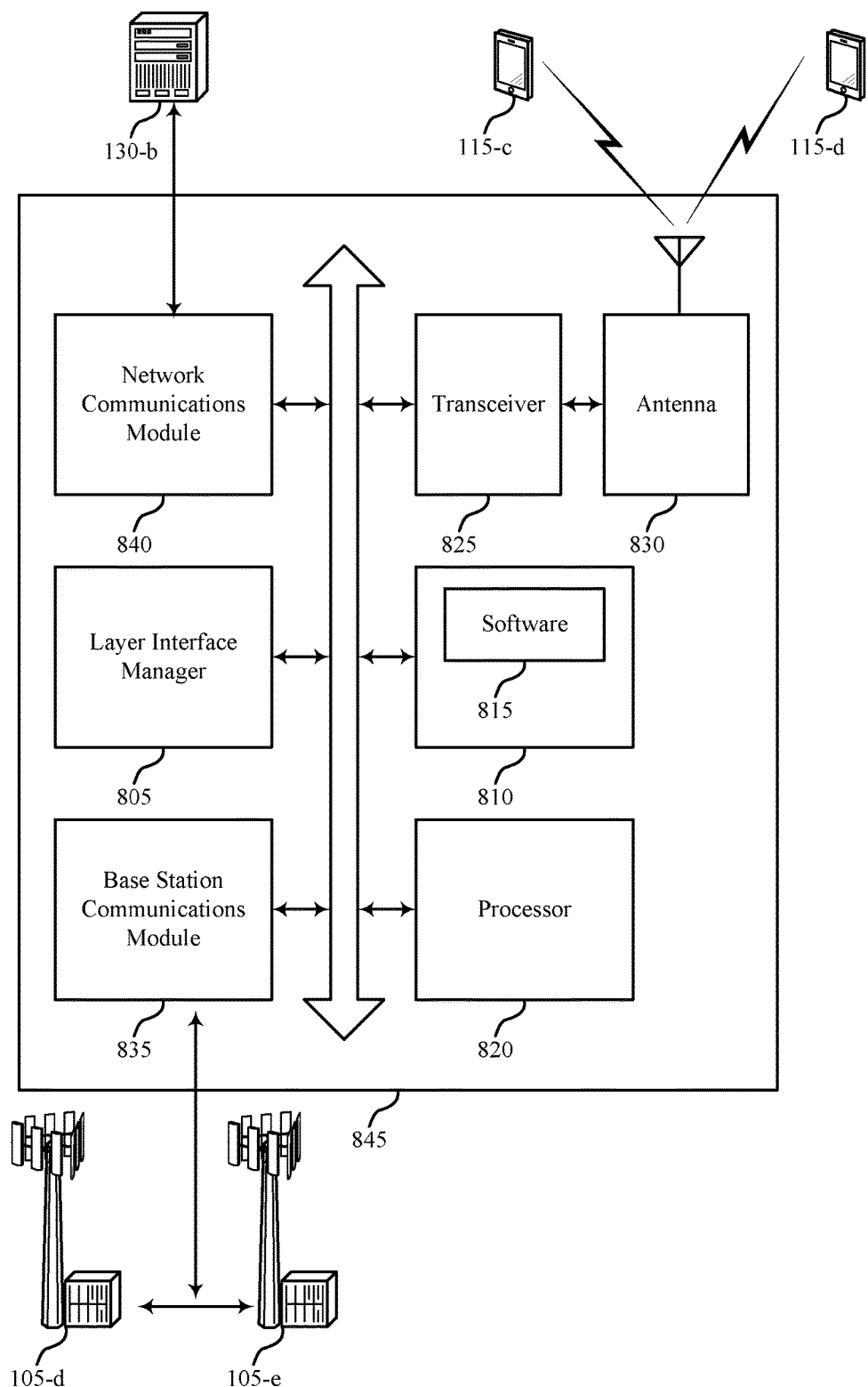
FIG. 8 illustrates a block diagram of a system including a base station that supports an LBT interface for logical DTX in accordance with aspects of the present disclosure.

FIG. 8 shows a diagram of a wireless system 800 including a device configured that supports an LBT interface for logical DTX in accordance with various aspects of the present disclosure. For example, system 800 may include base station 845, which may be an example of a wireless device 500, a wireless device 600, or a base station 105 as described with reference to FIGS. 1, 2, 4, and 5 through 7. Base station 845 may also include components for bi-directional voice and data communications including components for transmitting communications and components for receiving communications. For example, base station 845 may communicate bi-directionally with one or more UEs 115.

Base station 845 may also include layer interface manager 805, memory 810, processor 820, transceiver 825, antenna 830, base station communications module 835 and network communications module 840. Each of these modules may communicate, directly or indirectly, with one another (e.g., via one or more buses). The layer interface manager 805 may be an example of a layer interface manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., LBT interface for logical DTX, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The base station communications module 835 may manage communications with other base station 105, and may include a controller or scheduler for controlling communications with UEs 115 in cooperation with other base stations 105. For example, the base station communications module 835 may coordinate scheduling for transmissions to UEs 115 for various interference mitigation techniques such as beamforming or joint transmission. In some examples, base station communications module -95 may provide an X2 interface within an LTE/LTE-A wireless communication network technology to provide communication between base stations 105.

The network communications module 840 may manage communications with the core network (e.g., via one or more wired backhaul links). For example, the network communications module 840 may manage the transfer of data communications for client devices, such as one or more UEs 115.

Figure 9:
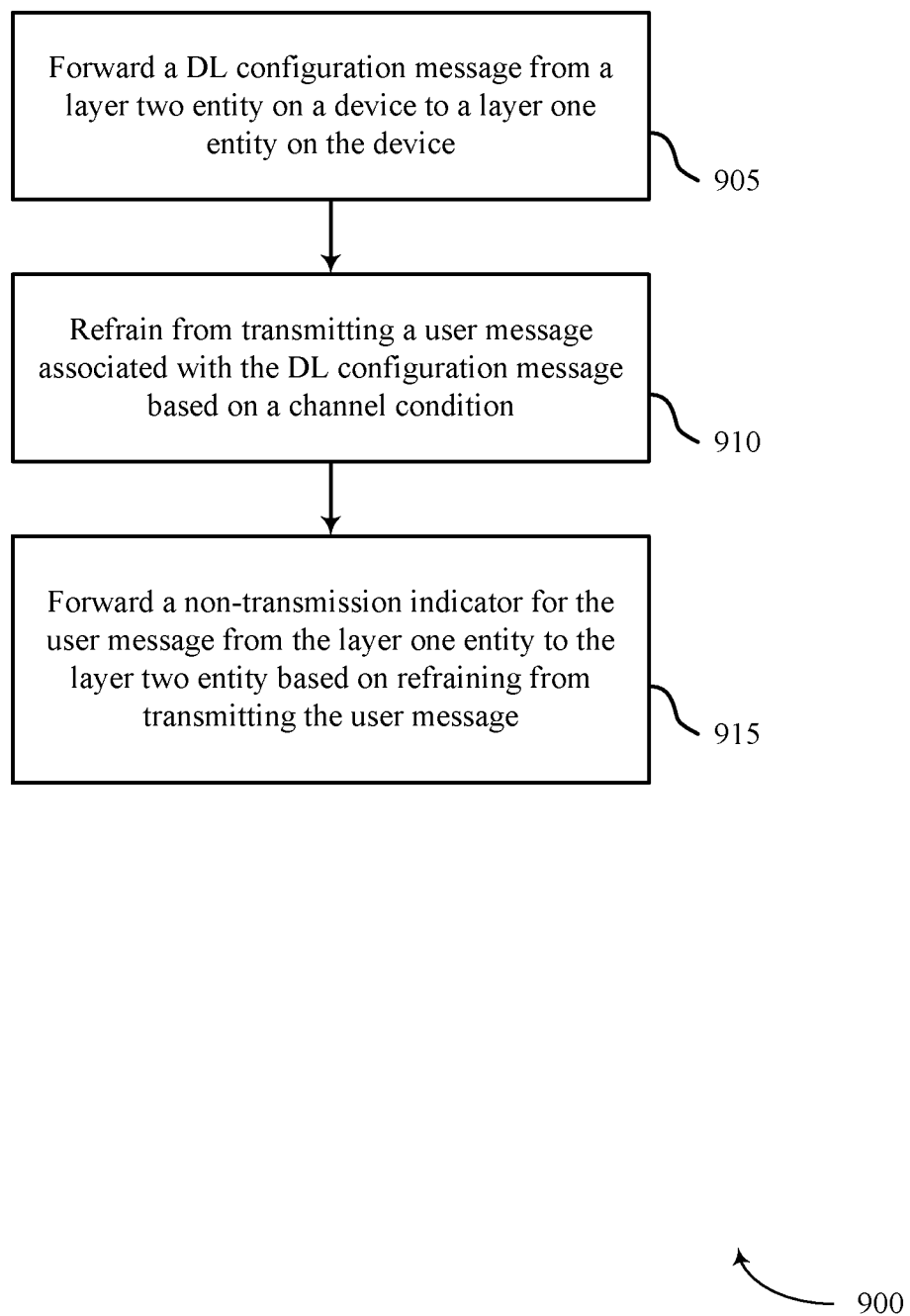
FIGS. 9 through 13 illustrate methods that support an LBT interface for logical DTX in accordance with aspects of the present disclosure.

FIG. 9 shows a flowchart illustrating a method 900 that supports an LBT interface for logical DTX in accordance with various aspects of the present disclosure. The operations of method 900 may be implemented by a device such as a base station 105 or its components as described with reference to FIGS. 1, 2, 4, and 8. For example, the operations of method 900 may be performed by the layer interface manager 510, 610, 700, 805 as described herein. In some examples, the base station 105 may execute a set of codes to control the functional elements of the device to perform the functions described below. Additionally or alternatively, the base station 105 may perform aspects the functions described below using special-purpose hardware.

At block 905, the base station 105 may forward a DL configuration message from a layer two entity on a device to a layer one entity on the device as described above with reference to FIGS. 2 through 4. In certain examples, the operations of block 905 may be performed by the DL configuration component as described with reference to FIGS. 6 and 7.

At block 910, the base station 105 may refrain from transmitting a user message associated with the DL configuration message based on a channel condition as described above with reference to FIGS. 2 through 4. In certain examples, the operations of block 910 may be performed by the message holding component as described with reference to FIGS. 6 and 7.

At block 915, the base station 105 may forward a non-transmission indicator for the user message from the layer one entity to the layer two entity based on refraining from transmitting the user message as described above with reference to FIGS. 2 through 4. In certain examples, the operations of block 915 may be performed by the non-transmission indicator as described with reference to FIGS. 6 and 7.

Figure 10:
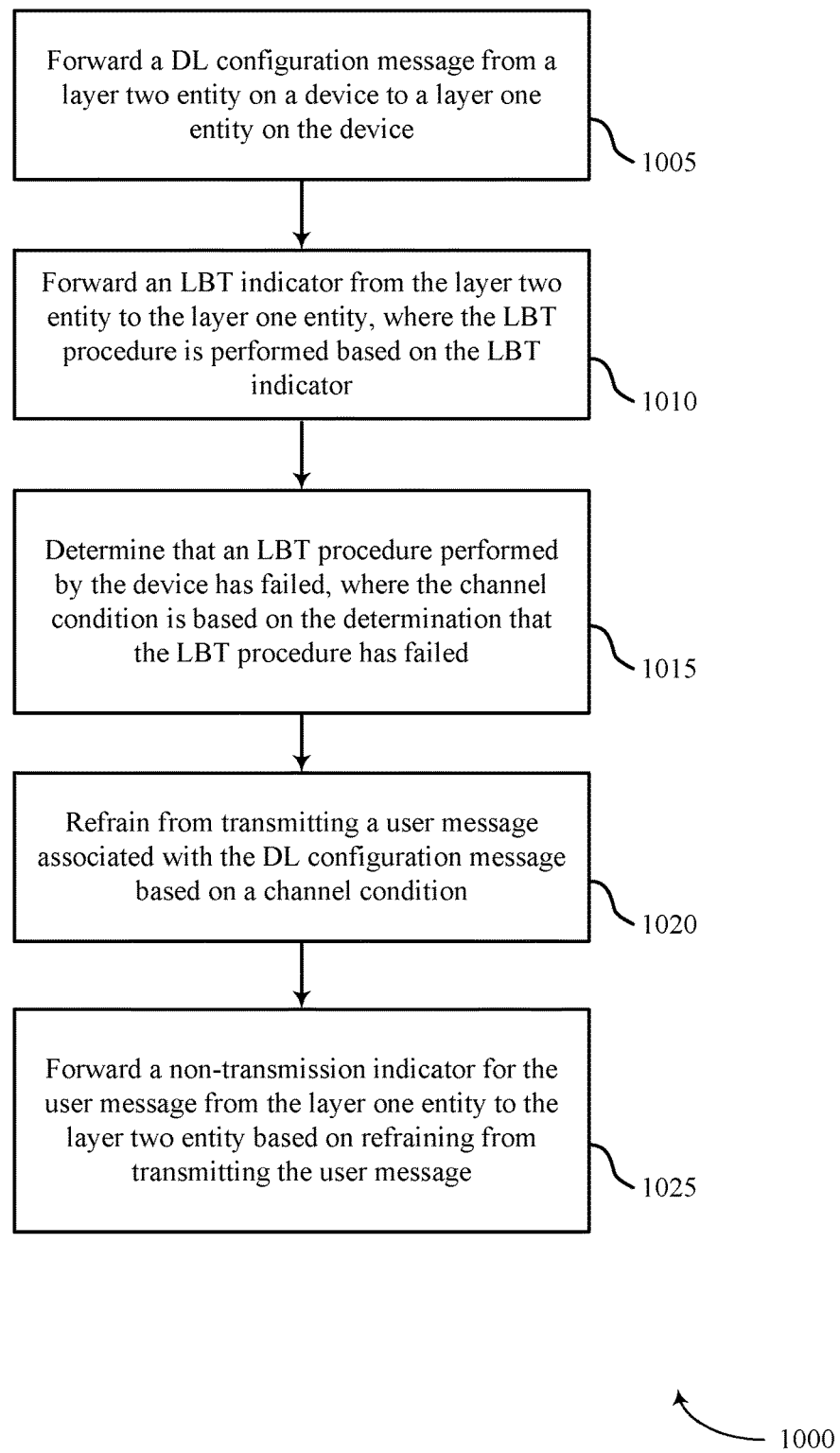

FIG. 10 shows a flowchart illustrating a method 1000 that supports an LBT interface for logical DTX in accordance with various aspects of the present disclosure. The operations of method 1000 may be implemented by a device such as a base station 105 or its components as described with reference to FIGS. 1, 2, 4, and 8. For example, the operations of method 1000 may be performed by the layer interface manager 510, 610, 700, 805 as described herein. In some examples, the base station 105 may execute a set of codes to control the functional elements of the device to perform the functions described below. Additionally or alternatively, the base station 105 may perform aspects the functions described below using special-purpose hardware.

At block 1005, the base station 105 may forward a DL configuration message from a layer two entity on a device to a layer one entity on the device as described above with reference to FIGS. 2 through 4. In certain examples, the operations of block 1005 may be performed by the DL configuration component as described with reference to FIGS. 6 and 7.

At block 1010, the base station 105 may forward an LBT indicator from the layer two entity to the layer one entity, where the LBT procedure is performed based on the LBT indicator as described above with reference to FIGS. 2 through 4. In certain examples, the operations of block 1010 may be performed by the LBT indicator component as described with reference to FIGS. 6 and 7.

At block 1015, the base station 105 may determine that a LBT procedure performed by the device has failed, where the channel condition is based on the determination that the LBT procedure has failed as described above with reference to FIGS. 2 through 4. In some cases, the LBT procedure is performed based on receiving the LBT indicator. In certain examples, the operations of block 1015 may be performed by the LBT component as described with reference to FIGS. 6 and 7.

At block 1020, the base station 105 may refrain from transmitting a user message associated with the DL configuration message based on a channel condition as described above with reference to FIGS. 2 through 4. In certain examples, the operations of block 1020 may be performed by the message holding component as described with reference to FIGS. 6 and 7.

At block 1025, the base station 105 may forward a non-transmission indicator for the user message from the layer one entity to the layer two entity based on refraining from transmitting the user message as described above with reference to FIGS. 2 through 4. In certain examples, the operations of block 1025 may be performed by the non-transmission indicator as described with reference to FIGS. 6 and 7.

Figure 11:
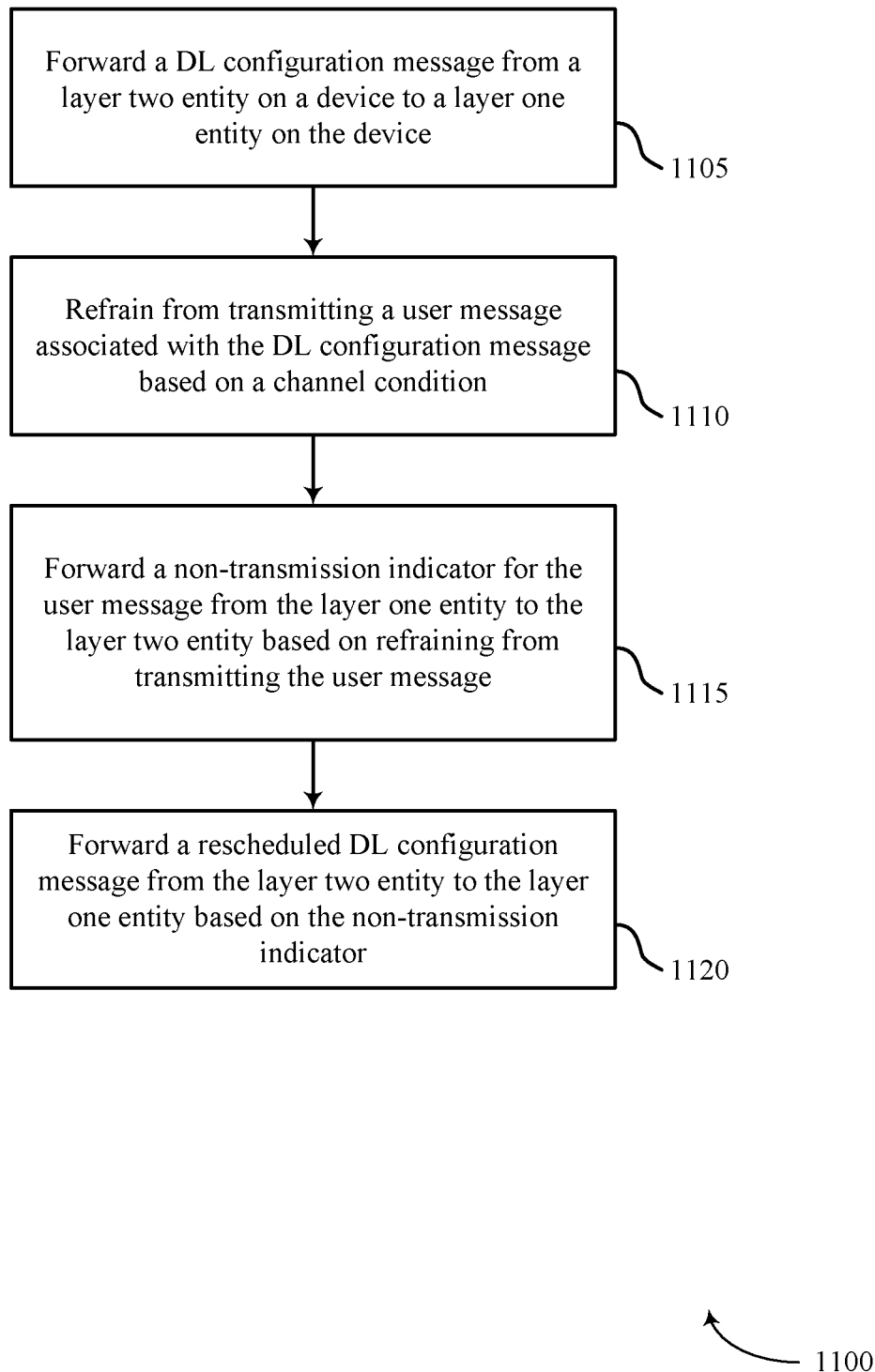

FIG. 11 shows a flowchart illustrating a method 1100 that supports an LBT interface for logical DTX in accordance with various aspects of the present disclosure. The operations of method 1100 may be implemented by a device such as a base station 105 or its components as described with reference to FIGS. 1, 2, 4, and 8. For example, the operations of method 1100 may be performed by the layer interface manager 510, 610, 700, 805 as described herein. In some examples, the base station 105 may execute a set of codes to control the functional elements of the device to perform the functions described below. Additionally or alternatively, the base station 105 may perform aspects the functions described below using special-purpose hardware.

At block 1105, the base station 105 may forward a DL configuration message from a layer two entity on a device to a layer one entity on the device as described above with reference to FIGS. 2 through 4. In certain examples, the operations of block 1105 may be performed by the DL configuration component as described with reference to FIGS. 6 and 7.

At block 1110, the base station 105 may refrain from transmitting a user message associated with the DL configuration message based on a channel condition as described above with reference to FIGS. 2 through 4. In certain examples, the operations of block 1110 may be performed by the message holding component as described with reference to FIGS. 6 and 7.

At block 1115, the base station 105 may forward a non-transmission indicator for the user message from the layer one entity to the layer two entity based on refraining from transmitting the user message as described above with reference to FIGS. 2 through 4. In certain examples, the operations of block 1115 may be performed by the non-transmission indicator as described with reference to FIGS. 6 and 7.

At block 1120, the base station 105 may forward a rescheduled DL configuration message from the layer two entity to the layer one entity based on the non-transmission indicator as described above with reference to FIGS. 2 through 4. In certain examples, the operations of block 1120 may be performed by the rescheduling component as described with reference to FIGS. 6 and 7.

Figure 12:
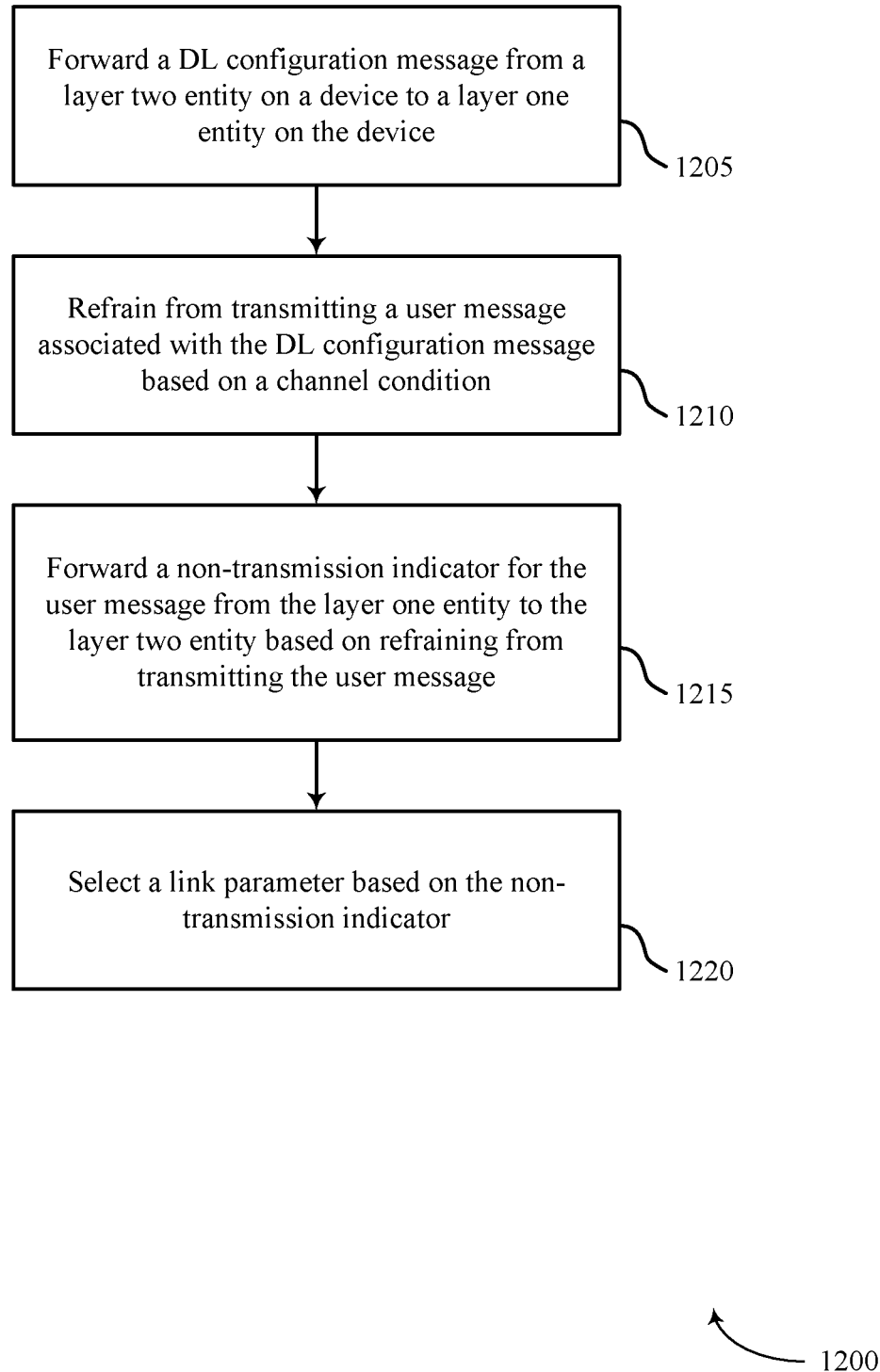

FIG. 12 shows a flowchart illustrating a method 1200 that supports an LBT interface for logical DTX in accordance with various aspects of the present disclosure. The operations of method 1200 may be implemented by a device such as a base station 105 or its components as described with reference to FIGS. 1, 2, 4, and 8. For example, the operations of method 1200 may be performed by the layer interface manager 510, 610, 700, 805 as described herein. In some examples, the base station 105 may execute a set of codes to control the functional elements of the device to perform the functions described below. Additionally or alternatively, the base station 105 may perform aspects the functions described below using special-purpose hardware.

At block 1205, the base station 105 may forward a DL configuration message from a layer two entity on a device to a layer one entity on the device as described above with reference to FIGS. 2 through 4. In certain examples, the operations of block 1205 may be performed by the DL configuration component as described with reference to FIGS. 6 and 7.

At block 1210, the base station 105 may refrain from transmitting a user message associated with the DL configuration message based on a channel condition as described above with reference to FIGS. 2 through 4. In certain examples, the operations of block 1210 may be performed by the message holding component as described with reference to FIGS. 6 and 7.

At block 1215, the base station 105 may forward a non-transmission indicator for the user message from the layer one entity to the layer two entity based on refraining from transmitting the user message as described above with reference to FIGS. 2 through 4. In certain examples, the operations of block 1215 may be performed by the non-transmission indicator as described with reference to FIGS. 6 and 7.

At block 1220, the base station 105 may select a link parameter based on the non-transmission indicator as described above with reference to FIGS. 2 through 4. In certain examples, the operations of block 1220 may be performed by the link parameter component as described with reference to FIGS. 6 and 7.

Figure 13:
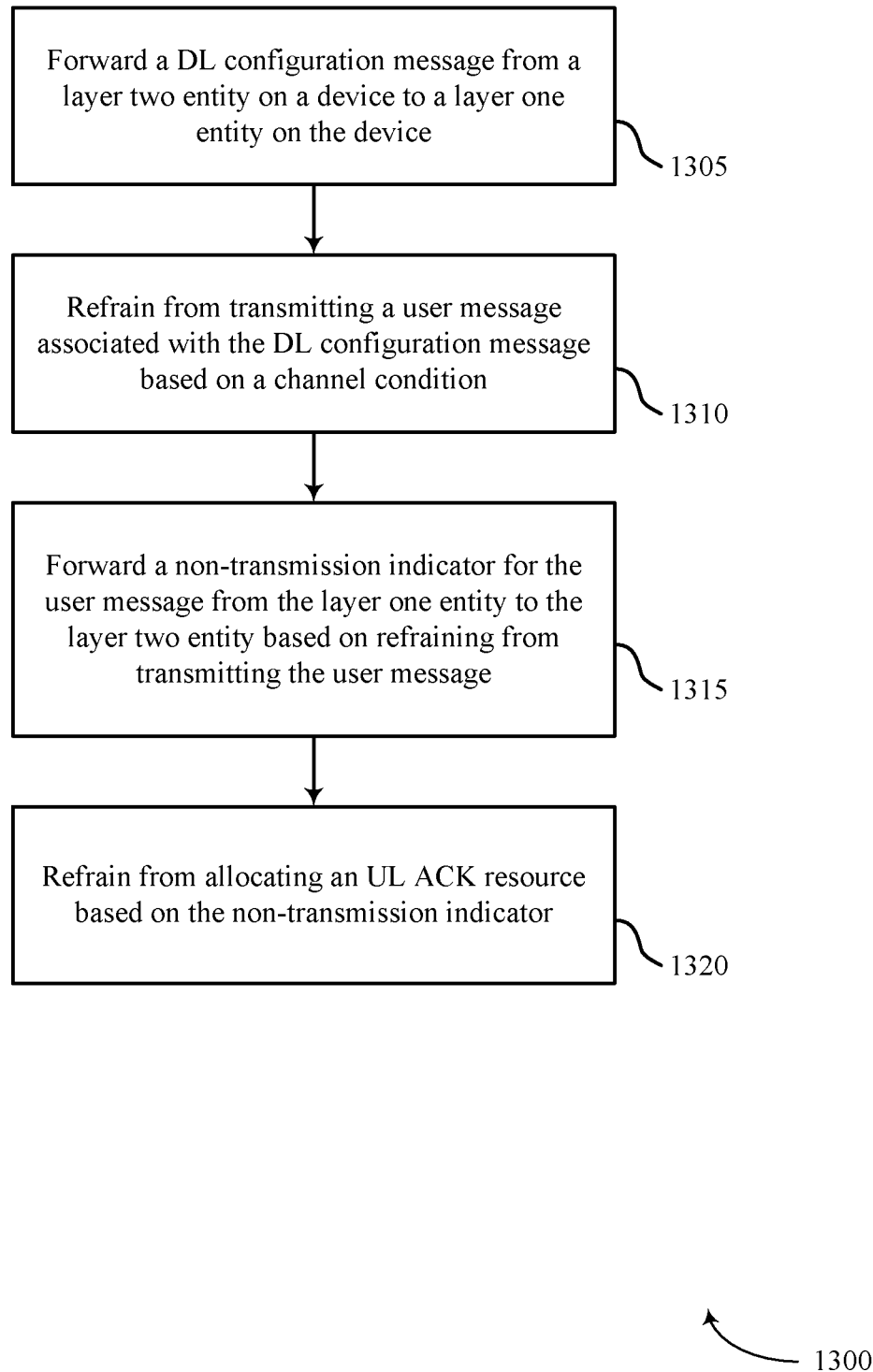

FIG. 13 shows a flowchart illustrating a method 1300 that supports an LBT interface for logical DTX in accordance with various aspects of the present disclosure. The operations of method 1300 may be implemented by a device such as a base station 105 or its components as described with reference to FIGS. 1, 2, 4, and 8. For example, the operations of method 1300 may be performed by the layer interface manager 510, 610, 700, 805 as described herein. In some examples, the base station 105 may execute a set of codes to control the functional elements of the device to perform the functions described below. Additionally or alternatively, the base station 105 may perform aspects the functions described below using special-purpose hardware.

At block 1305, the base station 105 may forward a DL configuration message from a layer two entity on a device to a layer one entity on the device as described above with reference to FIGS. 2 through 4. In certain examples, the operations of block 1305 may be performed by the DL configuration component as described with reference to FIGS. 6 and 7.

At block 1310, the base station 105 may refrain from transmitting a user message associated with the DL configuration message based on a channel condition as described above with reference to FIGS. 2 through 4. In certain examples, the operations of block 1310 may be performed by the message holding component as described with reference to FIGS. 6 and 7.

At block 1315, the base station 105 may forward a non-transmission indicator for the user message from the layer one entity to the layer two entity based on refraining from transmitting the user message as described above with reference to FIGS. 2 through 4. In certain examples, the operations of block 1315 may be performed by the non-transmission indicator as described with reference to FIGS. 6 and 7.

At block 1325, the base station 105 may refrain from reserving an UL ACK resource based on the non-transmission indicator as described above with reference to FIGS. 2 through 4. Additionally or alternatively, the base station 105 may refrain from advancing a HARQ retransmission counter based at least in part on the non-transmission indicator. In certain examples, the operations of block 1325 may be performed by the UL scheduling component as described with reference to FIGS. 6 and 7.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide that supports an LBT interface for logical DTX.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide that supports an LBT interface for logical DTX. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:
1. A method of wireless communication performed by a base station, comprising:
   forwarding a downlink (DL) configuration message from a layer two entity on the base station to a layer one entity on the base station;
   refraining from transmitting, by the base station, a user message associated with the DL configuration message based at least in part on a channel condition; and
   forwarding a non-transmission indicator for the user message from the layer one entity to the layer two entity based at least in part on refraining from transmitting the user message.
2. The method of claim 1, further comprising:
   determining that a listen-before-talk (LBT) procedure performed by the base station has failed, wherein the channel condition is based on the determination that the LBT procedure has failed.
3. The method of claim 2, further comprising:
   forwarding an LBT indicator from the layer two entity to the layer one entity, wherein the LBT procedure is performed based at least in part on the LBT indicator.
4. The method of claim 2, wherein determining that the LBT procedure has failed comprises:
   determining that at least one of a clear channel assessment (CCA) or an enhanced CCA (eCCA) has failed.
5. The method of claim 1, wherein the channel condition comprises a determination that au interference level exceeds a threshold.
6. The method of claim 1, further comprising:
   forwarding a rescheduled DL configuration message from the layer two entity to the layer one entity based at least in part on the non-transmission indicator.
7. The method of claim 6, wherein forwarding the rescheduled DL configuration message comprises:
   including a same hybrid automatic repeat request (IIARQ) process, a same redundancy version (RV), or a same modulation and coding scheme (MCS) or any combination thereof, as was included in the DL configuration message.
8. The method of claim 6, wherein forwarding the rescheduled DL configuration message comprises:
   forwarding the rescheduled DL configuration message with a higher precedence than the DL configuration message.
9. The method of claim 1, wherein the layer one entity is a physical (PHY) layer entity and the layer two entity is a medium access control (MAC) entity.
10. The method of claim 1, wherein forwarding the non-transmission indicator comprises:
    forwarding a logical negative acknowledgement (NACK) from the layer one entity to the layer two entity.
11. The method of claim 1, further comprising:
    selecting a link parameter based at least in part on the non-transmission indicator.
12. The method of claim 11, wherein selecting the link parameter comprises:
    refraining from modifying the link parameter from a value associated with the DL configuration message.
13. The method of claim 11, wherein selecting the link parameter comprises:
    adapting the link parameter based at least in part on one or more factors other than the non-transmission indicator.
14. The method of claim 11, wherein the link parameter comprises a MCS, an aggregation level, or both.
15. The method of claim 1, further comprising:
    refraining from reserving an uplink (UL) acknowledgement (ACK) resource based at least in part on the non-transmission indicator.

16. The method of claim 1, further comprising:
refraining from advancing an HARQ retransmission counter based at least in part on the non-transmission indicator.

17. An apparatus for wireless communication performed by a base station, comprising:
means for forwarding a downlink (DL) configuration message from a layer two entity on the base station to a layer one entity on the base station;
means for refraining from transmitting, by the base station, a user message associated with the DL configuration message based at least in part on a channel condition; and
means for forwarding a non-transmission indicator for the user message from the layer one entity to the layer two entity based at least in part on refraining from transmitting the user message.

18. The apparatus of claim 17, further comprising:
means for determining that a listen-before-talk (LBT) procedure performed by the base station has failed, wherein the channel condition is based on the determination that the LBT procedure has failed.

19. The apparatus of claim 18, further comprising:
means fur forwarding an LBT indicator from the layer two entity to the layer one entity, wherein the LBT procedure is performed based at least in part on the LBT indicator.

20. The apparatus of claim 18, wherein the means for determining that the LBT procedure has failed comprises:
means for determining that at least one of a clear channel assessment (CCA) or an enhanced CCA (eCCA) has failed.

21. The apparatus of claim 17, wherein the channel condition comprises a determination that an interference level exceeds a threshold.

22. The apparatus of claim 17, further comprising:
means for forwarding a rescheduled DL configuration message from the layer two entity to the layer one entity based at least in part on the non-transmission indicator.

23. The apparatus of claim 22, wherein the means for forwarding the rescheduled DL configuration message comprises:
means for including a same hybrid automatic repeat request (HARQ) process, a same redundancy version (RV), or a same modulation and coding scheme (MCS) or any combination thereof, as was included in the DL configuration message.

24. The apparatus of claim 22, wherein the means for forwarding the rescheduled DL configuration message comprises:
means for forwarding the rescheduled DL configuration message with a higher precedence than the DL configuration message.

25. The apparatus of claim 17, wherein the layer one entity is a physical (PHY) layer entity and the layer two entity is a medium access control (MAC) entity.

26. The apparatus of claim 17, wherein the means for forwarding the non-transmission indicator comprises:
means for forwarding a logical negative acknowledgement (NACK) from the layer one entity to the layer two entity.

27. The apparatus of claim 17, further comprising:
means for selecting a link parameter based at least in part on the non-transmission indicator.

28. The apparatus of claim 27, wherein the means for selecting the link parameter comprises:
means for refraining from modifying the link parameter from a value associated with the DL configuration message.

29. The apparatus of claim 27, wherein the means for selecting the link parameter comprises:
means for adapting the link parameter based at least in part on one or more factors other than the non-transmission indicator.

30. A non-transitory computer-readable medium storing code for wireless communication performed by a base station, the code comprising:
instructions to forward a downlink (DL) configuration message from a layer two entity on the base station to a layer one entity on the base station;
instructions to refrain from transmitting, by the base station, a user message associated with the DL configuration message based at least in part on a channel condition; and
instructions to forward a non-transmission indicator for the user message from the layer one entity to the layer two entity based at least in part on refraining from transmitting the user message.

* * * * *